United States Patent [19]

Edwards

[11] Patent Number: 5,099,713
[45] Date of Patent: Mar. 31, 1992

[54] GEAR DRIVE UNIT WITH MODIFICATIONS

[75] Inventor: Douglas F. Edwards, Medina, Ohio

[73] Assignee: Dana Corporation, Toledo, Ohio

[21] Appl. No.: 386,515

[22] Filed: Jul. 27, 1989

[51] Int. Cl.[5] ............................................. F16H 3/08
[52] U.S. Cl. ........................................ 74/371; 74/366
[58] Field of Search .............. 74/366, 369, 333, 371, 74/372, 373

[56] References Cited

U.S. PATENT DOCUMENTS

| Re. 32,125 | 4/1986 | von Kaler et al. | 74/371 |
|---|---|---|---|
| 735,012 | 7/1903 | Barnes | 74/371 |
| 3,890,850 | 6/1975 | Hauser et al. | 74/372 |
| 4,212,210 | 7/1980 | von Kaler et al. | 74/375 |
| 4,224,839 | 9/1980 | von Kaler | 74/701 |
| 4,232,569 | 11/1980 | Hauser et al. | 74/701 |
| 4,480,501 | 11/1984 | von Kaler | 74/713 |
| 4,656,886 | 4/1987 | Edwards | 74/475 |
| 4,662,241 | 5/1987 | Edwards | 74/701 |
| 4,702,119 | 10/1987 | Edwards | 74/371 |
| 4,702,120 | 10/1987 | Okada et al. | 74/371 |
| 4,713,983 | 12/1987 | Rundle | 74/371 X |
| 4,779,475 | 10/1988 | Irikura et al. | 74/371 |
| 4,809,560 | 3/1989 | Nemoto | 74/371 |
| 4,827,783 | 5/1989 | Yamaska et al. | 74/371 |
| 4,841,794 | 6/1989 | Hikishima | 74/372 X |
| 4,858,739 | 8/1989 | Nemoto | 74/371 X |

FOREIGN PATENT DOCUMENTS 423694  4/1991  France .................................. 74/371

*Primary Examiner*—Leslie A. Braun
*Assistant Examiner*—Benjamin Levi
*Attorney, Agent, or Firm*—Allen D. Gutchess, Jr.

[57] ABSTRACT

A transaxle or gear drive unit with an improved shift mechanism and gear drive is set forth. The shift mechanism is of the shift key type and certain gears have recesses to receive a lug of the shift key with the recesses having ramps which depress the lug when the key is shifted. One of the gears has a smooth bore adjacent the recesses to serve as a neutral position for the shift key. A wide gear having teeth or splines around its periphery extending the length thereof is rotatably mounted on one shaft of the gear drive unit. The wide gear has a plurality of additional gears affixed thereto for simultaneous rotation. The wide gear extends beyond the additional gears and connects with a forward speed gear and a reverse gear on another shaft. The wide gear thus functions as a mechanical connection for the additional gears as well as serving as a gear itself.

19 Claims, 3 Drawing Sheets

GEAR DRIVE UNIT WITH MODIFICATIONS

This invention relates to a two-shaft transaxle or gear drive unit with improvements in the shift mechanism and the gear drive.

A transaxle according to the invention has only two parallel shafts, thereby reducing the costs of the unit. A plurality of first forward speed gears and a first reverse gear are individually rotatably mounted on a first shaft within a housing, with the gears having bores with recesses. A shift member is rotatable with the first shaft and is selectively engagable with the recesses to cause the individual gears to be selectively individually rotated with the first shaft. More specifically, each of the first forward speed gears and the first reverse gear has a plurality of the recesses uniformly spaced circumferentially around the bore to receive a lug of a shift key so that the particular gear rotates with the first shaft when the shift key lug is in one of the recesses. The recesses have ramps extending in common directions from the bottoms of the recesses toward common faces of the gears. The ramps force the shift key lug toward a retracted position when the key moves from one gear to another, in order to prevent two gears from being engaged at the same time. Further, the reverse gear has a smooth bore next to its recesses, which bore serves as a neutral position for the shift key, without any additional collar or ring being required to provide neutral.

A plurality of second forward speed gears and a second reverse gear are supported on a second or output shaft. The second forward speed gears mesh with the first forward speed gears and the second reverse gear is connected through an intermediate idler gear with the first reverse gear. All of the second forward speed gears rotate together through a wide gear on which they are affixed. The wide gear extends beyond the second forward speed gears and constitutes the second reverse gear. In a preferred form, the wide gear also meshes with one of the forward speed gears on the first shaft so that the wide gear serves as a second reverse gear, a second forward speed gear, and a splined shaft which rotatably connects all of the other second forward speed gears.

It is, therefore, a principal object of the invention to provide a gear unit with an improved shift mechanism and an improved gear drive.

Another object of the invention is to provide a two-shaft transaxle in which a plurality of forward speed gears rotate together on a wide gear or splined shaft which also functions as at least one additional gear.

Yet another object of the invention is to provide a gear drive unit having a plurality of gears mounted on a shaft and having recesses engaged by a shift key, with one of the gears also having a smooth bore which serves as a neutral position.

Many other objects and advantages of the invention will be apparent from the following detailed description of a preferred embodiment thereof, reference being made to the accompanying drawings, in which.

Figure 1:
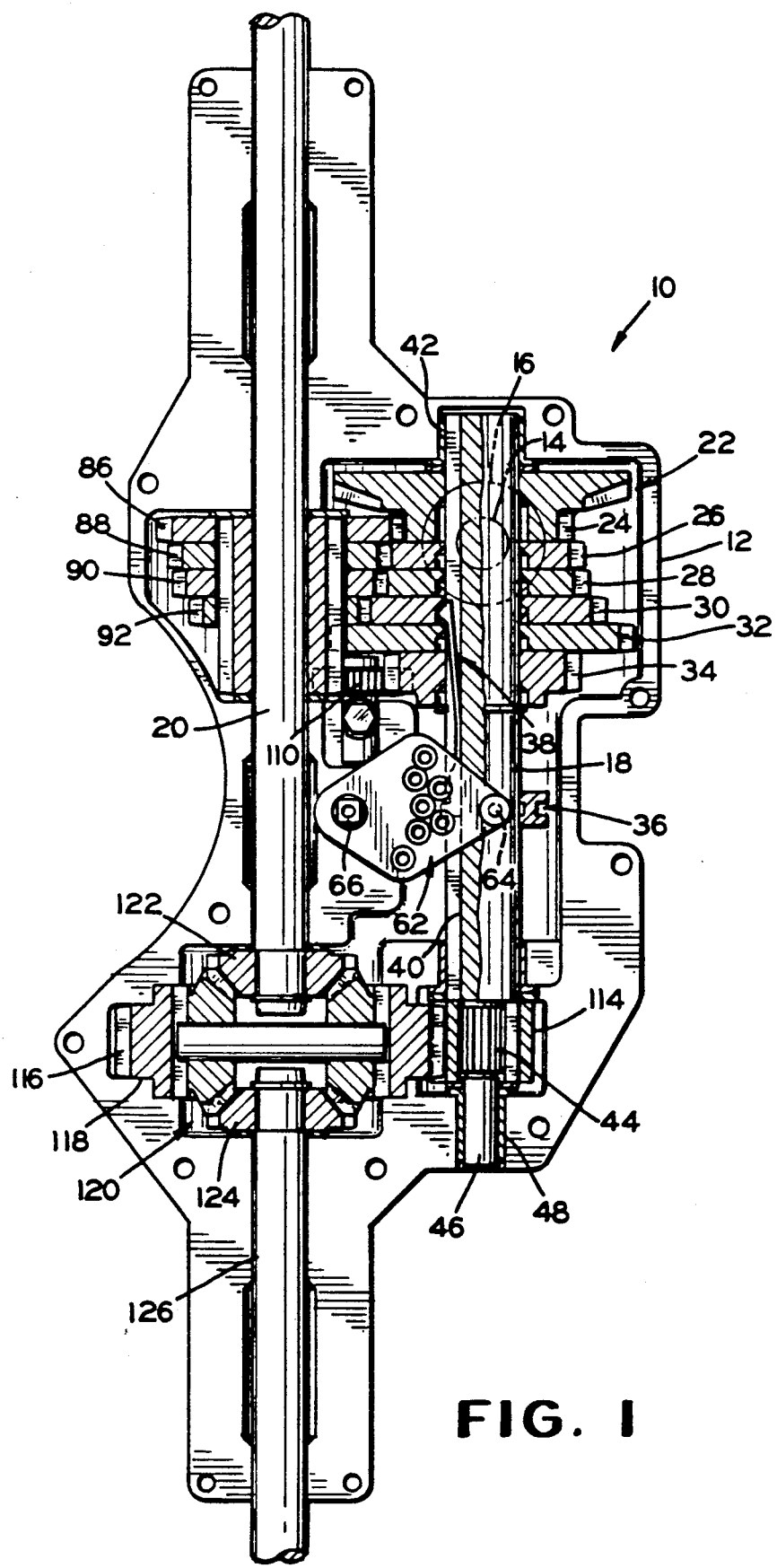
FIG. 1 is a somewhat schematic plan view, with parts in section, of a transaxle embodying the invention, with an upper housing part removed.

Referring particularly to FIG. 1, a gear drive unit or transaxle 10 in accordance with the invention includes a housing 12, only a lower part or half of which is shown, the upper part being removed. The transaxle has an input shaft 14 and a drive bevel gear 16, both shown in dotted lines. The input shaft extends through the upper part of the housing 12 and can be driven by any suitable means, such as a pulley (not shown) affixed thereto and driven through a belt by a pulley mounted on an engine of a small vehicle with which the transaxle is used. The transaxle also has a first or intermediate shaft 18 and a second or output shaft or axle 20.

A combination driven bevel gear 22 is rotatably supported on the shaft 18 and is driven by the drive bevel gear 16. A first forward speed gear or toothed member 24 is structurally integral and rotates with the driven bevel gear 22. Additional first forward speed gears or toothed members 26, 28, 30, and 32 are also rotatably supported on the shaft 18 and are separate from one another. A first reverse gear or toothed member 34 is adjacent the forward speed gear 32 and is also rotatably supported on the shaft 18.

The first forward speed gears 24-32 and the reverse gear 34 are selectively individually rotated with the shaft 18 by shift mechanism generally indicated at 36. The shift mechanism includes a pair of diametrically-opposite shift or draw keys 38 (see also FIG. 2) which are slidably mounted in diametrically-opposite, longitudinal grooves 40 in the shaft 18. In a preferred form, the grooves 40 extend from one end of the shaft 18, located in a bushing 42 mounted in the housing 12, toward the other end to a reduced splined portion 44 on the shaft 18. This enables the grooves 40 to be machined substantially more easily in the shaft 18. Further, the shaft 18 is of constant diameter from the end in the bushing 42 to the reduced splined portion 44. Beyond the splined portion, the shaft 18 has a smooth cylindrical end portion 46 received in a bushing 48 mounted in the housing 12.

Each of the shift keys 38 has a resilient shank 50 with a lug 52 at one end and a projection 54 at the other end. The shift key shank 50 is resilient and urges the lug 52 outwardly, away from the groove 40, as is well known in the art. The projection 54 is received in an inner annular groove 56 of a shift collar 58 which also has an outer annular groove 60. Both of the shift keys 38 are moved longitudinally of the shaft 18 through the shift collar 58 by a detent plate 62 located above the collar and having a downwardly-extending projection 64 which is received in the outer groove 60. The detent plate 62 is affixed to a shift shaft 66 which extends through and is rotatably supported by the upper part of the housing 12. The shaft 66 is connected to a suitable shift arm or lever above the transaxle which is turned to turn the detent plate 62 to move the collar 58 along the shaft 18. A shift plate of this general nature is shown and described in U.S. Pat. No. 4,656,886, issued Apr. 14, 1987, and will not be discussed in further detail.

When each of the shift keys 38 is moved longitudinally of the shaft 18, the lug 52 selectively engages recesses or notches 68 in bores 70 of the gears 26-32 to individually connect them with the shaft 18 so as to rotate therewith. The bore 70 of each of the gears has four of the recesses 68 which are the same size and shape and are uniformly positioned around the bore 70, at ninety degree angles from one another. Each of the recesses 68 has a bottom 72, side walls 74, and a ramp 76 extending angularly upwardly toward common faces of the gears and toward a common end of the shaft 18. This angle is from thirty degrees to sixty degrees with respect to the recess bottom 72 and preferably from forty degrees to fifty degrees. The ramps can have arcuate and beveled surfaces as discussed more fully in U.S. Pat. No. 4,702,119, issued Oct. 27, 1987. Other patents which show gears with various forms of notches are U.S. Pat. No. 735,012, issued July 28, 1903; French patent No. 423,694 dated April, 1911; and U.S. Pat. No. 3,890,850, issued June 24, 1975.

In accordance with the invention, the reverse gear 34 also has recesses 78 in a bore 80 thereof, which recesses can be of the same size and shape as the recesses 68 in the gears 26-32. However, the reverse gear 34 is thicker, in this instance, having an extension hub 82 facing away from the forward gear 32. The smooth portion of the bore 80 beyond the recesses constitutes from thirty percent to seventy percent of the thickness of the gear 34 and preferably from forty percent to sixty percent of the thickness of the gear. In this manner, the smooth portion of the bore 80, located between the notches 78 in the gear 34 and the notches 68 in the gear 32, constitutes a neutral position for the shift key 38 and specifically for the lug 52 thereof, between reverse and forward. In this manner, no separate collar or ring or the like is needed to provide a neutral position for the shift key. This reduces production costs by eliminating a part and likewise reduces assembly costs and time.

The combination gear 22 has conventional recesses or notches 84 formed therein to receive the key lug 52 when the key is in its extreme right hand position, the inner ends of these recesses being blunt or squared off without ramps.

Four second, forward speed gears or toothed members 86, 88, 90, and 92 are rotatably supported by the output shaft or axle 20 and mesh, respectively, with the first four forward speed gears 24, 26, 28, and 30. All of the gears 24-34 and 86-92 have conventional, involute-shaped gear teeth, in the preferred form. In accordance with the invention, the four gears 86-92 are mounted together for non-rotatable movement relative to one another by a thick or wide spur gear or splined shaft 94 (FIGS. 3 and 4) the width or length of which substantially exceeds the combined width of the four gears 86-92. The wide gear 94, in this instance, has sixteen involute gear teeth or splines 96 around the periphery thereof and extending throughout its length. The four gears 86-92 have central holes 98-104 of similar size and shape to the gear 94 and mesh with the periphery thereof to lock all four of the gears 86-92 together for simultaneous rotation.

Figure 3:
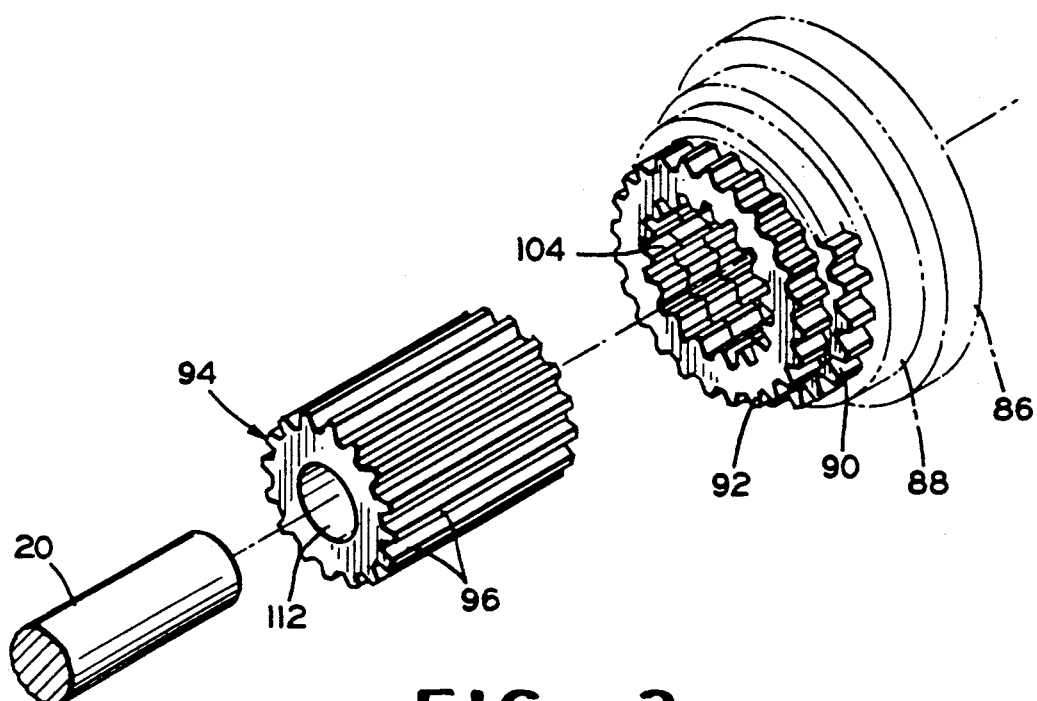
FIG. 3 is a view in perspective of certain gears and a connecting wide gear of the transaxle.
Figure 4:
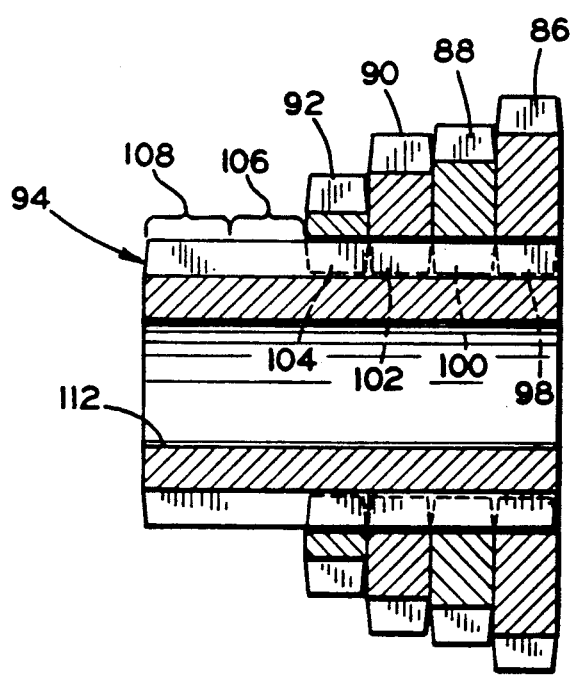
FIG. 4 is an enlarged view in transverse cross section of the gear components shown in FIG. 3.

An intermediate portion 106 (FIG. 4) of the gear 94 adjacent the gear 92 meshes with the first forward speed gear 32 (FIG. 1) to constitute a fifth, second forward speed gear. Finally, an end portion 108 (FIG. 4) of the wide gear 94 meshes with an idler gear 110 (FIG. 1) which, in turn, meshes with the first reverse gear 34 so that the end portion 108 of the gear 94 constitutes a second reverse gear. Consequently, it will be seen that the wide gear 94 serves as a splined shaft for engaging the four second forward speed gears 86-92, serves as a fifth, second forward speed gear by engaging the forward speed gear 32, and serves as a second reverse gear by connecting to the reverse gear 34 through the reverse idler gear 110. The wide gear 94 has a smooth bore 112 throughout its length by means of which the gear is rotatably supported on the output shaft 20. As shown in FIGS. 3 and 4, the gear 94 is of uniform cross section substantially throughout its length.

A drive pinion gear or toothed member 114 is affixed to the splined portion 44 of the shaft 18 and rotates therewith. The gear 114 meshes with and drives a ring gear 116 which is located around a housing or supporting member 118 of a differential 120. This can be the type shown in U.S. Pat. No. 4,662,241, issued May 5, 1987, or in U.S. Pat. No. 4,232,569, issued Nov. 11, 1980. The differential includes bevel or miter gears 122 and 124 which are affixed to an end of the output shaft 20 and an end of another output shaft 126, respectively. The shafts 20 and 126 are axially aligned and are considered to be one shaft. If a differential is not used, the ring gear 116 can be suitable affixed to both ends of the shafts 20 and 126 to cause them to be driven together as a single shaft.

In the operation of the transaxle, when the lug 52 of the shift key 38 engages the notch 84 of the combination gear 22, the pinion drive gear 114 is driven directly through the shaft 18. The gear 114 thereby rotates the ring gear 116 and the output shaft 20 at a first forward speed. When the lug 52 engages the recess 68 of the first forward speed gear 26, the drive is through the second forward speed gears 86 and 88, which rotate together on the wide gear 94, and back through the first gear 26 which is connected with the shaft 18 and rotates the drive pinion gear 114 at a second forward speed. With the lug 52 in the recess 68 of the first forward speed gear 28, a third forward speed is attained through the gears 24, 86, 90, and 28. With the lug in the recess of the first forward speed gear 30, as shown, the drive is then through the gears 24, 86, 92, and 30. When the lug 52 is engaged in the recess of the first forward speed gear 32, the drive is then through the gear 24, the gear 85, the wide gear 94 and the gear 32.

Figure 2:
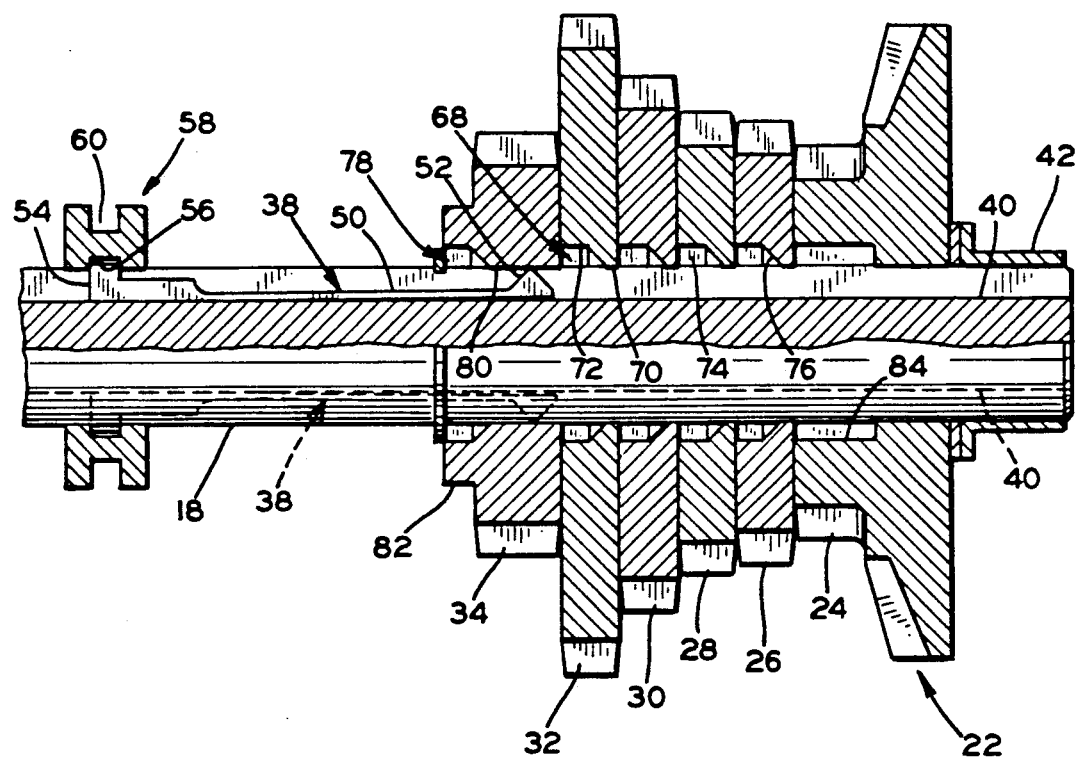
FIG. 2 is an enlarged, fragmentary view in section of shift mechanism of the transaxle of FIG. 1.

With the lug 52 in the neutral bore 80 of the reverse gear 34, as shown in FIG. 2, the transaxle is in neutral. Finally, with the lug 52 engaged in the recess 78 of the first reverse gear 34, the drive is through the gears 24 and 86, through the portion 108 of the wide gear 94, and through the idler 110 and the first reverse gear 34 to drive the shaft 18 and the drive pinion gear 114 in the opposite direction.

Various modifications of the above described embodiment of the invention will be apparent to those skilled in the art, and it is to be understood that such modifications can be made without departing from the scope of the invention, if they are within the spirit and the tenor of the accompanying claims.

I claim:

1. A gear drive unit comprising a shaft, a first forward speed gear rotatably mounted on said shaft, said first gear having a first bore therethrough and a first recess in said bore, a reverse gear rotatably mounted on said shaft adjacent said first gear, and having a second bore therethrough with a second recess, said second recess opening at a side of said reverse gear opposite the side adjacent said forward speed gear and terminating at said second bore, said second bore beyond said second recess having a smooth and unbroken portion, whereby said smooth and unbroken portion of said bore constitutes a neutral position and a shift key mounted for longitudinal movement with respect to said shaft, and being selectively engagable with the recess of said first forward speed gear, said smooth and unbroken portion of said second bore, and said second recess of said reverse gear.

2. A gear drive unit according to claim 1 wherein said gear drive unit has a combination gear rotatably mounted on said shaft on the side of said first gear opposite said reverse gear, said combination gear has a driven bevel gear and a structurally-integral, additional forward speed gear, said combination gear has a third bore extending therethrough with a third recess therein opening at a side of said combination gear facing toward said first forward speed gear.

3. A gear drive unit according to claim 2 wherein an inner end of said third recess is blunt, without a ramp.

4. A gear drive unit according to claim 1 wherein said smooth and unbroken portion of said second bore constitutes from thirty percent to seventy percent of the thickness of said reverse gear.

5. A gear drive unit according to claim 1 wherein said smooth and unbroken portion of said second bore constitutes from forty percent to fifty percent of the thickness of said reverse gear.

6. A gear drive unit according to claim 1 wherein said gear drive unit further comprises a second shaft, a wide gear with a smooth bore rotatably mounted on said second shaft, said wide gear having a plurality of teeth extending the length thereof and uniformly spaced around the periphery thereof, said wide gear being of uniform cross section substantially throughout its length, a second forward speed gear mounted for non-rotatable movement on said wide gear, and said wide gear having a first portion of its peripheral teeth engaged with means engaging said reverse gear.

7. A gear drive unit according to claim 6 wherein said wide gear has a second portion of its peripheral teeth engaged with said first forward speed gear.

8. A gear drive unit according to claim 7 wherein said second portion of said wide gear is between the first portion thereof and said second forward speed gear.

9. A gear drive unit according to claim 6 wherein said second forward speed gear has a central hole with teeth meshing with the peripheral teeth of said wide gear.

10. A two-shaft gear drive unit comprising a first shaft, a first forward speed gear rotatably mounted on said first shaft, said first gear having a first bore therethrough and a first recess in said bore, a reverse gear rotatably mounted on said shaft adjacent said firs gear and having a second bore with a second recess, said second recess opening at a face of said reverse gear opposite the side adjacent said first forward speed gear, said second recess having a ramp extending angularly from the bottom of the recess toward said first forward speed gear, and terminating at said second bore of said reverse gear, said second bore beyond said ramp having a smooth and unbroken portion, whereby said smooth and unbroken portion constitutes a neutral position, a shift key mounted for longitudinal movement with respect to said first shaft, and being selectively engagable with said first recess of said first forward speed gear, said smooth and unbroken portion of said second bore, and said second recess of said reverse gear, said drive unit having a second shaft which is parallel to said first shaft, a wide gear with a smooth bore rotatably mounted on said second shaft, said wide gear having a plurality of teeth extending the length thereof and uniformly spaced around the periphery thereof, a second forward speed gear mounted for non-rotatable movement on said wide gear, said wide gear having a first portion of its peripheral teeth engaged with means engaging said reverse gear, and said wide gear having a second portion of its peripheral teeth engaged with said first forward speed gear.

11. A gear drive unit according to claim 10 wherein said second portion of said wide gear is between the first portion thereof and said second forward speed gear.

12. A gear drive unit according to claim 10 wherein said second forward speed gear has a central hole with teeth meshing with the peripheral teeth of said wide gear.

13. A gear drive unit according to claim 10 wherein said smooth and unbroken portion of said reverse gear constitutes from thirty percent to seventy percent of the thickness of said reverse gear.

14. A gear drive unit comprising a housing, a bushing mounted in said housing, a shaft, an end of said shaft being rotatably supported by said bushing, a first forward speed gear rotatably mounted on said shaft, said first gear having a first bore therethrough and a first recess in said bore, a reverse gear rotatably mounted on said shaft adjacent said first gear, and having a second bore therethrough with a second recess, said second recess opening at a side of said reverse gear opposite the side adjacent said first forward speed gear and terminating at said second bore, said second bore beyond said second recess having a smooth and unbroken portion, whereby said smooth and unbroken portion of said second bore constitutes a neutral position, said shaft having a longitudinal groove extending completely to the end of said shaft, and a shift key mounted for longitudinal movement with respect to said shaft in said longitudinal groove, and being selectively engagable with the recess of said first forward speed gear, said smooth and unbroken portion of said second bore, and said second recess of said reverse gear.

15. A two-shaft gear drive unit comprising a first shaft, a first forward speed gear mounted on said first shaft, a reverse gear mounted on said first shaft adjacent said first gear, a second shaft which is parallel to said shaft, a wide gear with a smooth bore rotatably mounted on said second shaft, said wide gear having a plurality of teeth extending the length thereof and uniformly spaced around the periphery thereof, a second forward speed gear mounted for non-rotatable movement on said wide gear, said wide gear having a first portion of its peripheral teeth engaged with means engaging said reverse gear, and said wide gear having a second portion of its peripheral teeth engaged with said first forward speed gear.

16. A gear drive unit according to claim 15 wherein said second portion of said wide gear is between the first portion thereof and said second forward speed gear.

17. A gear drive unit according to claim 15 wherein said first forward speed gear has a first bore therethrough and a first recess in said bore, said reverse gear has a second bore therethrough with a second recess, said second recess opening at a side of said reverse gear opposite the side adjacent said first forward speed gear, said second recess having a ramp extending angularly from the bottom of the recess toward said first forward speed gear, and terminating at said second bore, said second bore beyond said ramp having a smooth and unbroken portion, whereby said smooth and unbroken portion of said bore constitutes a neutral position, and a shift key mounted for longitudinal movement with respect to said first shaft, and being selectively engagable with the recess of said first forward speed gear, said smooth and unbroken portion of said second bore, and said second recess of said reverse gear.

18. A gear drive unit according to claim 15 wherein said gear drive unit has an additional second forward speed gear mounted for non-rotatable movement on said wide gear adjacent said second forward speed gear.

19. A gear drive unit according to claim 18 wherein said second forward speed gear and said additional second forward speed gear have central holes with teeth meshing with the peripheral teeth of said wide gear.

* * * * *

UNITED STATES PATENT AND TRADEMARK OFFICE
CERTIFICATE OF CORRECTION

PATENT NO. : 5,099,713
DATED : March 31, 1992
INVENTOR(S) : Douglas F. Edwards

It is certified that error appears in the above-identified patent and that said Letters Patent is hereby corrected as shown below:

Column 5, line 46, claim 10, line 5, change "firs" to --first--.

Column 6, line 39, claim 15, line 4, after "said" (second occurrence) insert --first--.

Signed and Sealed this

Twenty-ninth Day of June, 1993

Attest:

MICHAEL K. KIRK

Attesting Officer

Acting Commissioner of Patents and Trademarks